United States Patent

Terranova

[15] 3,644,963
[45] Feb. 29, 1972

[54] PROCEDURE FOR THE REMOVAL OF THE BONES FROM HAMS AND SIMILAR CUTS OF MEAT

[72] Inventor: Federico Terranova, 45 Parkview Drive N.E., Grand Rapids, Mich. 49503

[22] Filed: July 24, 1969

[21] Appl. No.: 844,575

[52] U.S. Cl. .................................................17/46
[51] Int. Cl. ...........................................A22c 17/04
[58] Field of Search ...........................17/46, 1 U

[56] References Cited

UNITED STATES PATENTS

| | | |
|---|---|---|
| 2,857,619 | 10/1958 | Massengill ..............................17/1 U |
| 2,897,536 | 8/1959 | Bergstrom et al. .....................17/1 U |
| 3,412,424 | 11/1968 | Brown et al. ...........................17/1 U |
| 3,486,187 | 12/1969 | Zwiep et al. ............................17/46 |

*Primary Examiner*—Lucie H. Laudenslager
*Attorney*—Glenn B. Morse

[57] ABSTRACT

A ham or a structurally similar cut of meat is conditioned for a coaxial rotary meat-stripping operation by removal of the kneecap and pinbone. The pinbone is removed by a tool surrounding the pinbone, and moved axially to a sufficient depth to isolate it from the adjacent leg bone, and preferably to a sufficient degree to sever it from its connection thereto at the upper extremity of the pinbone. The kneecap is removed by a nipping operation from the side.

3 Claims, 6 Drawing Figures

Patented Feb. 29, 1972    3,644,963

INVENTOR.
Federico Terranova
BY
ATTORNEY 3,644,963

PROCEDURE FOR THE REMOVAL OF THE BONES FROM HAMS AND SIMILAR CUTS OF MEAT

BACKGROUND OF THE INVENTION

The mechanical removal of the bones from hams and similar meats has long been recognized as a desirable objective. Two problems have persistently plagued the development of such machines, and these are (a) the requirement of the removal of substantially all the meat in good condition without bone inclusions, and (b) the difficulty of accommodating the angular relationship of the upper and lower leg bones, which previously required a change in direction of the action of the machine with respect to the piece of meat being deboned. The presence of the so-called "pinbone" (a small bone parallel to the main lower leg bone) interfered with the meat removal, and the structure and tendons around the knee joint prevented straightening out the leg bones into a straight line. The variations between one piece of meat and another make it impossible to predetermine the exact path of cutting which a machine might follow.

SUMMARY OF THE INVENTION

Applicant has established that preliminary removal of the pinbone prior to stripping of the meat from the main leg bones removes the interference with the action of a meat-stripping machine in this area, and removal of the kneecap facilitates the straightening of the leg assembly so that the ham can be passed through the machine in a straight line. The removal of the kneecap appears to eliminate a physical obstruction to the straightening of the knee joint, and severs tendons that interfere with the straightening. Absence of the kneecap during the meat-stripping operation also removes an interference with the passage of the stripping device over the joint. The particular meat-stripping device for which these procedures have been developed is positioned by the engagement of mechanical members by the bones themselves, and the resilient mounting of the kneecap (if left in place during the stripping operation) could conceivably result in tearing the kneecap loose along with the meat as the stripping device passes over the joint. Subsequent removal of the kneecap from a more or less random mass of meat is much more difficult than when performed as a preliminary operation, when the configuration of the assembly provides a fairly accurate indication of the position of the kneecap. The preliminary conditioning procedures centering in the removal of the pinbone and the kneecap are intended primarily for use in conjunction with a meat-stripping machine of the type disclosed in the application for United States patent of Ferdinand Weits and Theodore C. Zwiep (case "301") as a means of increasing the utility of that and similar machines.

DESCRIPTION OF THE PREFERRED PROCEDURES

Figure 1:
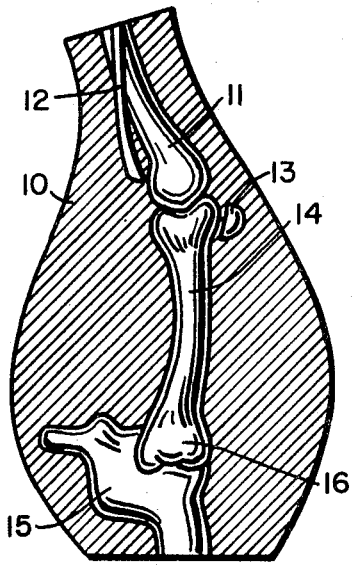
FIG. 1 is a cross section of a ham showing the relationship of the bones as the ham is usually prepared by the slaughterhouse.

In the initial condition of the ham, the mass of meat 10 surrounds the lower leg bone 11, the pinbone 12, the kneecap 13, the upper leg bone 14, and the aitchbone 15. The latter is a portion of the pelvic structure. It is normal practice to remove the aitchbone manually, to expose the knob-shaped upper end 16 of the leg bone 14 for engagement with the meat-stripping machine. The machine, however, is operable from either end of the leg assembly, and it is preferable to have the aitchbone removed regardless of the direction of movement of the stripping machine along the leg assembly.

Figure 2:
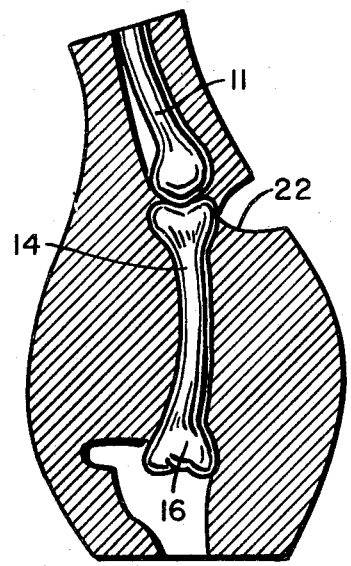
FIG. 2 shows the preparation of the ham for the deboning operation by the removal of the aitchbone, kneecap and pinbone.
Figure 3:
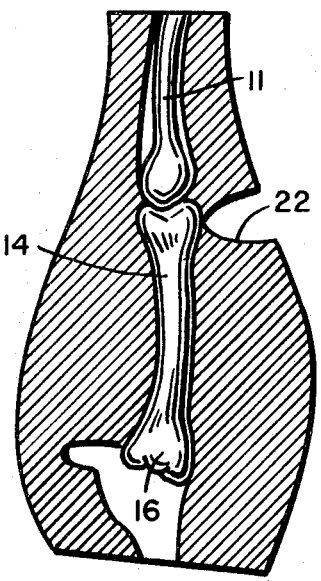
FIG. 3 shows the ham in the FIG. 2 condition, straightened into coaxial relationship of the main leg bones.
Figure 5:
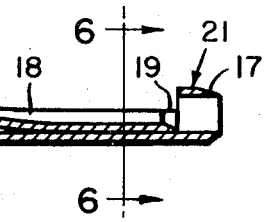
FIG. 5 is a sectional view showing a tool for removal of the pinbone.
Figure 6:
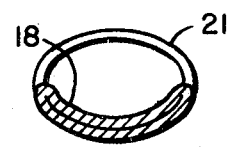
FIG. 6 is a section on an enlarged scale on the plane 6—6 of FIG. 5.

The ham is conditioned for the operation of the stripping machine by the removal of the pinbone 12 by the insertion of a tool beside or around the pinbone, inserted from the exposed lower end. The position of the ham shown in FIGS. 1, 2 and 3 corresponds to the usual position of these cuts of meat as they are suspended from meat hooks, but which is inverted with respect to the position on the live animal. It is the latter which is referred to herein as a reference for "upper" and "lower." A tool of the type shown in FIGS. 5 and 6 is usable in the removal of the pinbone, and this tool is essentially a piece of modified pipe. The end of the pipe is beveled at 17 to a sharpened edge, and a transverse slot in the pipe isolates the portion adjacent the beveled edge 17 from the remainder of the pipe so that a ramp configuration can be impressed at 18 to facilitate the removal of the pinbone from the tool after the severing operation has been completed, and the tool withdrawn with the pinbone in it. Preferably, the advance end of the portion 18 is beveled or rounded, as shown at 19, to minimize the obstruction to the bone. The opposite end 20 of the tool may be of any desired length, and functions as a handle. The ring-shaped portion 21 is preferably rendered somewhat oval in cross-sectional configuration, to correspond with the upper end of the pinbone and its junction with the leg bone 11. This arrangement makes it possible to apply a twist to the tool to facilitate severing this connection. With the exposed end of the pinbone entered in the ring 21, the axial movement of the tool will isolate the pinbone from the surrounding meat.

The removal of the kneecap 13 is performed by a nipping operation which produces the cutout 22. This operation can either by in the nature of a straight line movement of a cutter having the illustrated configuration, or may be performed by a plierlike cutter with a generally arcuate path of movement. This cutting action not only removes the kneecap, but severs the tendons associated with it. The joint between the leg members 11 and 14 is thus prepared so that nothing but solid bone structure is present for the action of the stripping machine.

Figure 4:
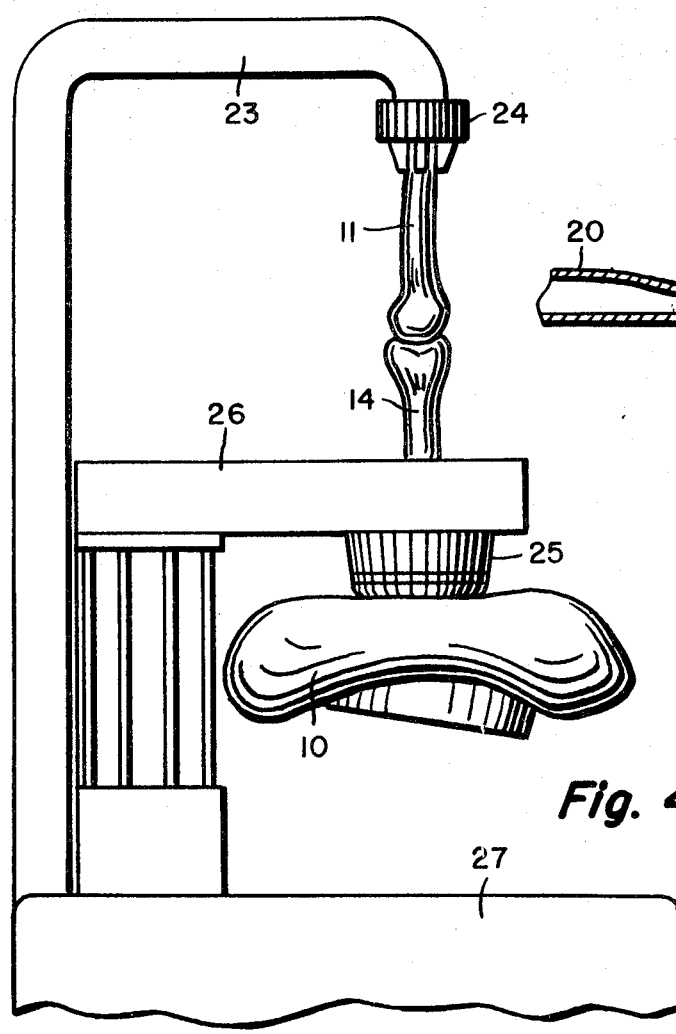
FIG. 4 is a schematic view showing a coaxial deboning machine.

FIG. 4 illustrates a meat-stripping machine of the type described in the pending application for patent of Ferdinand Weits and Theodore C. Zwiep. An over arm 23 may be considered as fixed with respect to the frame of the machine, and supports a holding device 24 adapted to grip either end of the leg assembly, according to particular adapters that may be used. A rotary stripping mechanism indicated at 25 is mounted on the beam assembly 26 which moves vertically under the action of the mechanism in the housing 27. Downward movement of the beam 26 strips the meat from the leg assembly, with the mechanism 25 defining an orifice through which the leg bones are passed. The stripping mechanism 25 has a rotative action generated by mechanism within the beam structure 26, and the preliminary preparation of the ham by the removal of the pinbone 12 and the kneecap 13 places the ham in condition so that the tension of the machine is able to straighten the leg assembly to the position shown in FIGS. 3 and 4, and proceed with the removal of the ham without interference from the presence of the auxiliary bones. Since the stripping members present in the mechanism 25 are positioned by bearing directly against the bone, the practical operation of the machine requires the removal of all bones that do not present a solid structure for the machine to operate against. The straightening aspect of the leg assembly also eliminates the need for the machine to deviate in its course of movement as it passes over the knuckle joint between the leg members 11 and 14.

I claim:

1. In a method of removing meat from the main leg bones of a ham and similar sections of meat which comprises the steps of:

holding said bone at least one end thereof to restrain it against longitudinal movement;

and while holding the bone moving a plurality of rotating bone separator members longitudinally of the bone in proximity to the bone, said members being rotated about the bone in proximity thereto for separating the meat from the bone;

the improvement comprising:

disengaging and withdrawing the pin bone from the main leg bone previous to the above steps.

2. A method as defined in claim 1 wherein said pinbone is disengaged by axial movement of a cutting member passing between the pinbone and the lower leg bone.

3. A method as defined in claim 2, wherein the said axial movement of the cutting member is continued to the point of severing the connection of the upper end of the pinbone to the lower leg bone.

* * * * *